Feb. 26, 1963  C. W. E. WALKER  3,079,551
APPARATUS AND METHOD FOR MEASUREMENT OF MOISTURE CONTENT
Filed Jan. 23, 1958  4 Sheets-Sheet 1
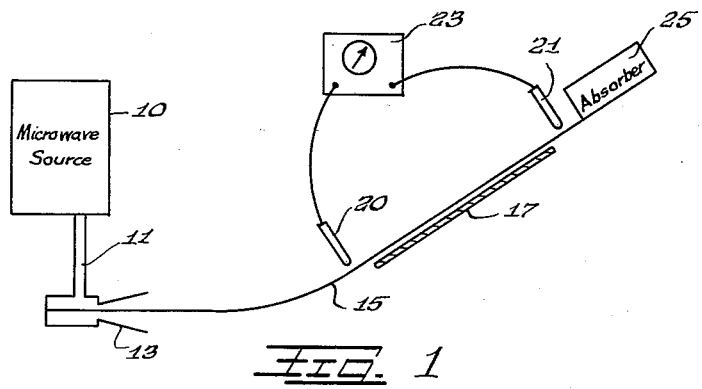
FIG. 1
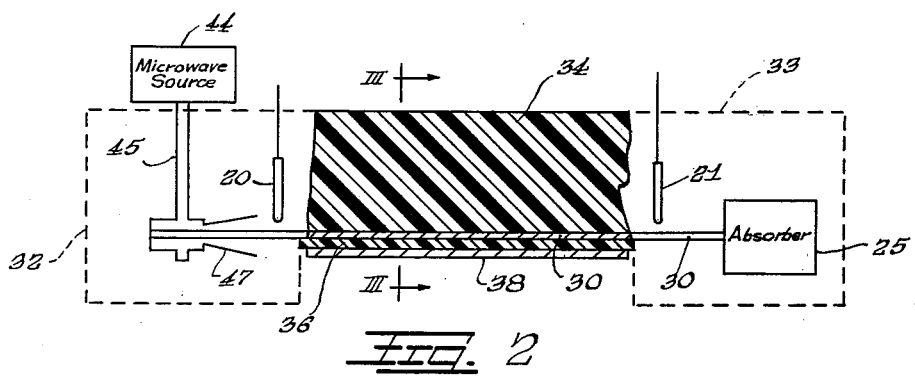
FIG. 2
FIG. 3
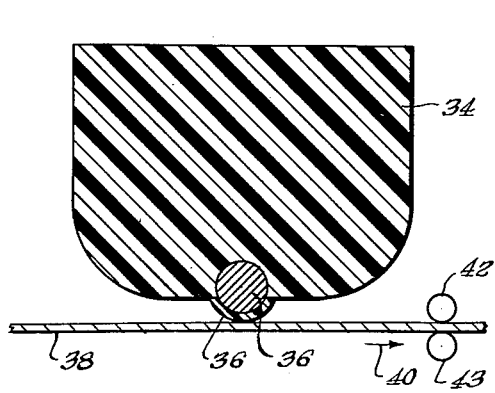
FIG. 4
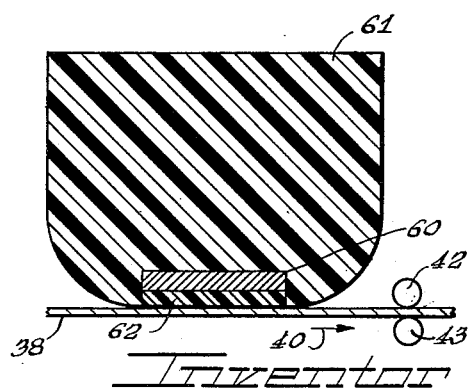
Inventor
Charles W. E. Walker
By Hill, Sherman, Meroni, Gross & Simpson Attys

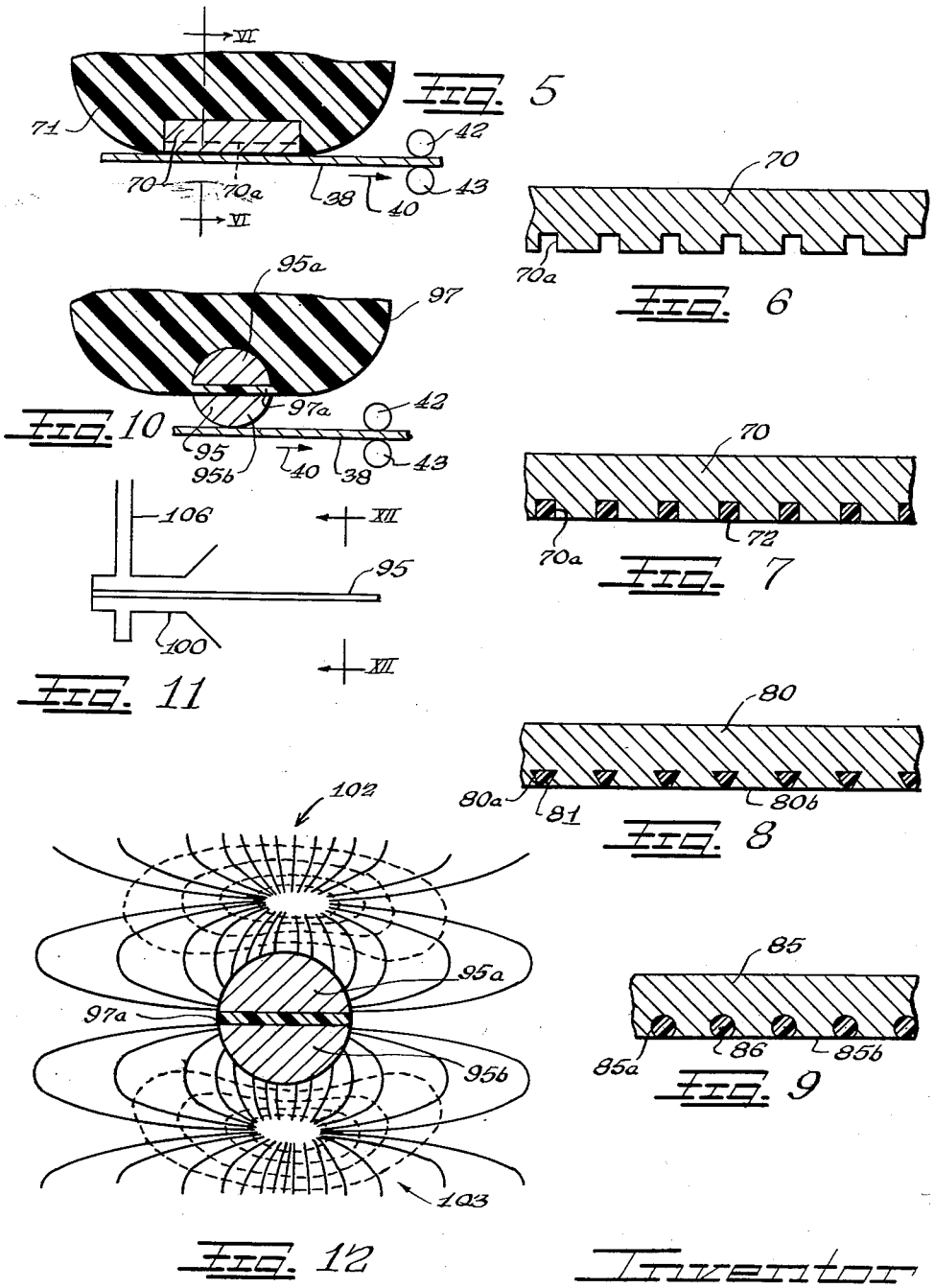

Feb. 26, 1963 C. W. E. WALKER 3,079,551
APPARATUS AND METHOD FOR MEASUREMENT OF MOISTURE CONTENT
Filed Jan. 23, 1958 4 Sheets-Sheet 3
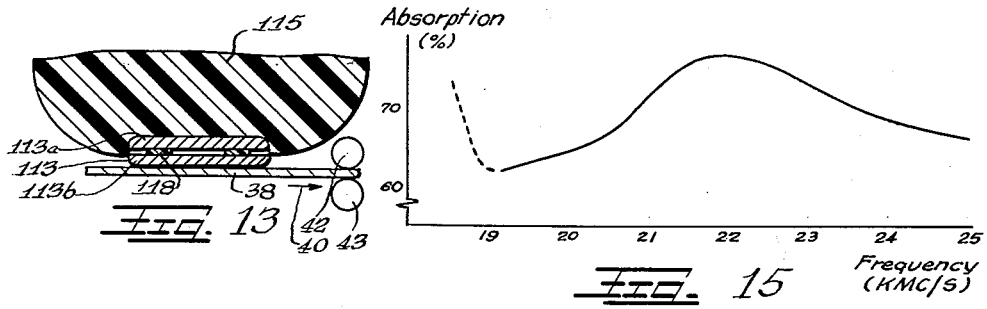
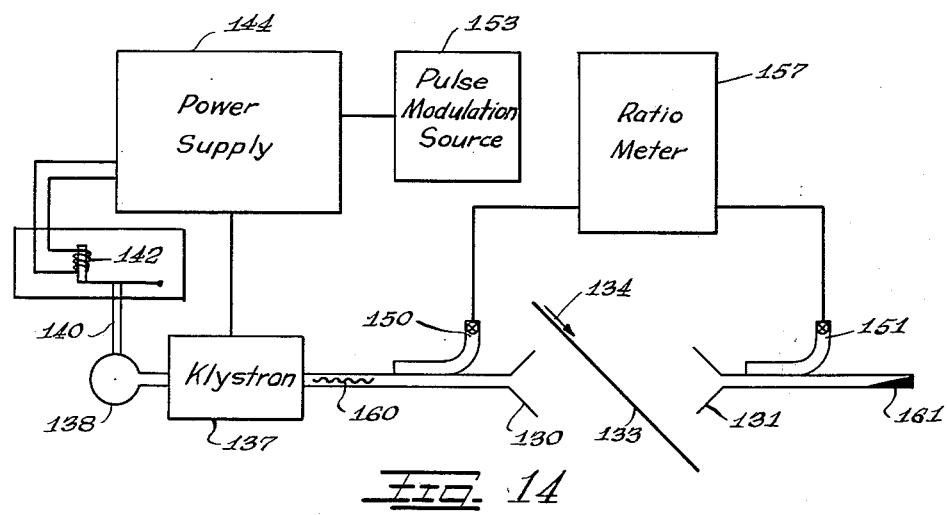
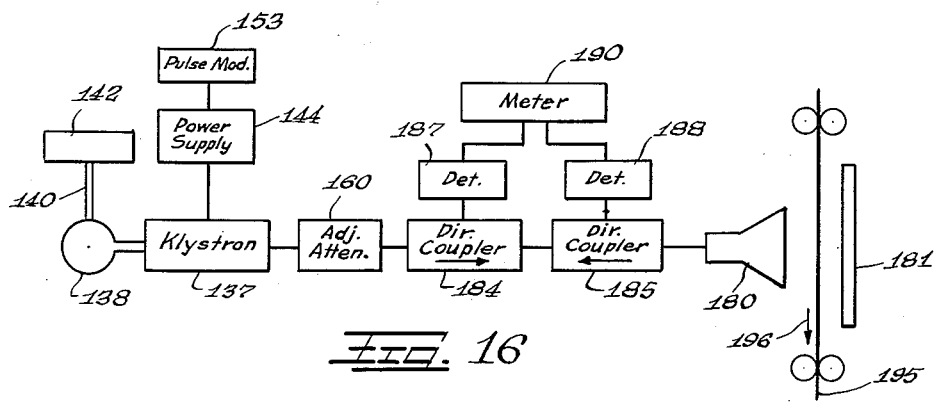
Charles W.E. Walker Feb. 26, 1963 C. W. E. WALKER 3,079,551
APPARATUS AND METHOD FOR MEASUREMENT OF MOISTURE CONTENT
Filed Jan. 23, 1958 4 Sheets-Sheet 4

Inventor
Charles W.E. Walker
By Kill, Sherman, Meroni, Gross & Simpson Attys

United States Patent Office 3,079,551
Patented Feb. 26, 1963

3,079,551
APPARATUS AND METHOD FOR MEASUREMENT OF MOISTURE CONTENT
Charles W. E. Walker, Beloit, Wis., assignor to Beloit Iron Works, Beloit, Wis., a corporation of Wisconsin
Filed Jan. 23, 1958, Ser. No. 710,766
34 Claims. (Cl. 324—58.5)

This invention relates to a method and means for sensing a constituent of material substantially affecting microwave energy and particularly to a method and means of determining the moisture content of solid material.

The present application is a continuation in part of my copending application Serial No. 644,394 filed March 6, 1957, now abandoned.

An important application of the present invention is in the measurement of the moisture content of paper and paper products. For example, the method of the present invention may be utilized to determine the moisture content of a paper web in paper making machinery at both the input and the output of the dryer section of the machine. Heretofore, several non-objective means of determining moisture have been used, primarily the "feel" by the operator. In recent years, use has been made of the "Beta Gauge" which involves a measurement of transmitted Beta-radiation from radioactive material. Devices have also been provided on paper machines which operate on the basis of the change in electrical resistance due to moisture or which depend on a change of electrical capacitance. Each of these instruments, however, has suffered from particular limitations, mainly in the fact that they included in the measurement the change in the thickness and weight or composition of the paper itself and were not capable of measuring the amount of moisture alone. The total measurement of the Beta Gauge included the change in radiation due to the change of total mass included in the measurement gap. It became necessary, then, for the determination of moisture alone, to use two or more gauges for comparison purposes. Both gauges were subject to the same errors and the measurement was highly inaccurate.

It is found that microwave energy while being appreciably absorbed by moisture particularly at certain "resonance absorption frequencies" is relatively unaffected by paper and similar materials. Thus the present method represents an important advance over the prior art methods described above in the measurement of moisture content of paper and paper products.

It is an important object of the present invention to provide a novel and improved system and method for sensing a constituent of solid, liquid or gaseous material by means of microwave energy.

It is a further important object of the present invention to provide a system and method for determining moisture content or the like which is relatively insensitive to density variations in the material under test.

It is another object of the present invention to provide a system and method for determining the moisture content of moving material.

Still another object of the invention is to provide novel system and method for determining moisture content or the like which is capable of averaging the moisture content over the width of the material, for example over the width of a moving web of paper or the like.

Yet another object of the invention is to provide a highly stable and accurate apparatus and method for determining the moisture content or the like of solid materials.

Other objects, features and advantages of the present invention will be more fully apparent from the following detailed description taken in connection with the accompanying drawings, in which:

FIGURE 1 is a somewhat diagrammatic illustration of a first embodiment of the present invention;

FIGURE 2 is a somewhat diagrammatic longitudinal sectional view illustrating a second embodiment in accordance with the present invention;

FIGURE 3 is a cross sectional view taken generally along the line III—III of FIGURE 2;

FIGURE 4 is a cross sectional view similar to FIGURE 3 and illustrating a modification of the system of FIGURES 2 and 3.

FIGURE 5 is a cross sectional view similar to FIGURE 4 but illustrating a further modified form of the invention;

FIGURE 6 is a fragmentary longitudinal sectional view taken generally along the line VI—VI of FIGURE 5.

FIGURES 7, 8 and 9 are fragmentary longitudinal sectional views similar to FIGURE 6 and illustrating further modifications of the system of FIGURES 2 and 3;

FIGURE 10 is a fragmentary cross sectional view similar to FIGURE 3 but illustrating a further modification of the invention;

FIGURE 11 is a diagrammatic illustration of the means for launching microwave energy along the wave guide of FIGURE 10;

FIGURE 12 is a diagrammatic cross sectional view taken generally along the line XII—XII of FIGURE 11 and illustrating the configuration of microwave energy with respect to the wave guide of FIGURES 10 and 11;

FIGURE 13 is a fragmentary cross sectional view similar to FIGURE 10 but illustrating a further modification;

FIGURE 14 is a diagrammatic illustration of a further system and method in accordance with the present invention utilizing frequency modulation of the microwave energy;

FIGURE 15 illustrates a plot of absorption as a function of frequency obtained utilizing a sample of 20 pound kraft paper having 12% moisture content;

FIGURE 16 is a diagrammatic illustration of an embodiment similar to FIGURE 14 utilizing frequency modulation wherein the microwave energy is reflected from a conductive surface back to the radiating horn;

As shown on the drawings:

Figure 17:
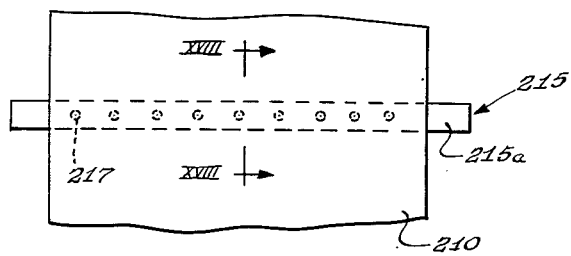
FIGURE 17 is a diagrammatic illustration of a further embodiment of the invention.

It is found that when microwave power is transmitted along a wave guide and a body of solid material such as a paper web is disposed in close proximity to the wave guide, any moisture carried by the paper web will produce a power loss which will provide a measure of the moisture content of the web. The term "microwave" as used herein refers to radio frequency wavelengths of the order of a few meters or less. The present invention particularly involves wavelengths of 2.5 centimeters or less in the radio frequency spectrum. It has been discovered that at certain critical frequencies in the microwave region, for example 22,235 megacycles per second, the microwave energy transmitted along a waveguide is relatively unaffected by the thickness of the paper web while being critically sensitive to the moisture content of the body. The critical frequencies where absorption due to moisture or other constituent being sensed is at a maximum will be termed herein "resonance absorption frequencies."

FIGURE 1 illustrates an embodiment of the present invention utilizing the foregoing findings wherein the microwave power is generated by a suitable source 10 and is delivered by means of a waveguide 11 to a suitable coupler or wave launcher 13 for projecting the energy along an open wave guide 15. The wave guide 15 may comprise a wire preferably having an exterior surface which is a good electrical conductor, rather than a semiconductor or insulator. For example, the wire may be of hardened steel and be in sliding contact with a travelling paper web 17. Alternatively, the wave guide 15 may comprise a metallic conductor having a thin coating of wear resistant material in sliding contact with the web, a suitable coating being an aluminum oxide ceramic known as "Rockide." In the case of an open wire wave guide of this type, the microwave energy will surround the guide and extend approximately the distance of one wavelength from the external surface of the guide.

In order to obtain an electrical indication of the amount of power absorbed by the paper web 17 and thus to obtain an indication of the moisture content thereof, suitable microwave power sensing means 20 and 21 may be disposed in coupled relation to the wave guide 15 suitably separated in terms of the power loss to be measured. These sensing means may comprise bolometers, crystal detectors or the like either capacitively or inductively coupled to the microwave energy travelling along the wave guide 15. The output from the sensing means 20 and 21 may be compared by any suitable electrical means to obtain a measure of the power absorbed by the moisture contained in the paper web 17. For example, the outputs from the sensing means 20 and 21 may be delivered to a suitable ratio meter or bridge such as is commonly utilized to measure microwave standing wave ratios. An example of a suitable commercially available instrument is the Hewlett-Packard ratio meter Model 416A. Beyond the second sensor 21, suitable absorbing means 25 may be provided such as water for preventing reflection of the microwave energy. A suitable meter is indicated diagrammatically at 23 which may be provided with a suitable scale for indicating a numerical value related to the power absorbed by the paper 17, for example, a difference or ratio between the output of the sensing means 20 and the output of the sensing means 21 may be indicated by the meter. The meter may be calibrated by projecting microwave energy along the wave guide 15 in the absence of the web 17 or with a completely dry web substituted for the web 17.

FIGURES 2 and 3 illustrate a modified form of the invention wherein a wire 30 which is preferably of a metallic conductive material is embedded in a first dielectric material indicated partially by the dash lines 32 and 33 and partly in section at 34. A second dielectric material indicated at 36 is interposed between the wire 30 and the web 38 of paper or the like which travels in sliding contact with the material 36. As indicated in FIGURE 3, the web 38 may be driven in the direction of the arrow 40 by any suitable means such as indicated at 42 and 43.

As in the embodiment of FIGURE 1, microwave energy is delivered to the wire 30 from a suitable microwave generating means 44 by means of a wave guide 45 and a launching device 47. Suitable sensing means may be utilized as in the embodiment of FIGURE 1, and microwave energy sensing devices have been indicated in FIGURE 2 and given the same reference numerals as in FIGURE 1 so that the description of these devices in connection with FIGURE 1 is applicable to the present embodiment as well.

Experiments have shown that if a dielectric is placed on one side only of a single conductor surface wave transmission line carrying microwave energy, a large proportion of that microwave energy is lost from the conductor. It appears that this is due to the dielectric causing a retardation of the wave within the dielectric so that the wave travels slower in the dielectric on the one side of the conductor than in the air on the other side, the wave being refracted away from the conductor into the dielectric, just as light is refracted at an air-glass interface. In order to produce a retardation of the wave on the side of the conductor adjacent the web 38 comparable to that which is produced by the dielectric 34, the second dielectric medium 36 is provided as a relatively thin coating of substantially higher dielectric constant than the relatively massive dielectric 34 on the side of the conductor 30 away from the web 38. The use of a dielectric material between the wire 30 and the web 38 besides tending to maintain the microwave energy in proper association with the wire has the further advantage that it may be selected to provide a high abrasion resistance. For example, the material 36 may be of a very hard ceramic material or alumina known as "Rockide." By way of example, the wire 30 may be of copper, and the dielectric material 32, 33 and 34 may be of "Teflon." For a copper wire having a diameter of .2 centimeter, the material 36 may have a thickness of the order of .0545 centimeter and a dielectric constant of the order of 80 for example.

Troubles from standing waves, due to reflections of microwave energy, do not seem to be serious with single conductor surface wave transmission lines, but it may be desirable to frequency modulate the microwave signal so as to average out any small effects which may exist. Since the frequency affects the thickness of the dielectric coat 36 which is required, frequency modulation will reduce the criticality of this thickness and will reduce the effects of variations in this thickness.

The embodiment of FIGURE 4 is identical to that of FIGURES 2 and 3 except that a flat bar 60 of electrically conductive material is embedded in the first dielectric 61 and has a flat strip dielectric coating 62 in contact with the travelling web 38. The description of FIGURES 2 and 3 otherwise applies to the embodiment of FIGURE 4.

In FIGURES 5 and 6, instead of using a thin layer of a high dielectric constant as in the embodiments of FIGURES 3 and 4, a flat bar metallic conductor 70 is embedded in a dielectric material 71 and has a series of transverse grooves such as indicated at 70a in FIGURE 6 for slowing the velocity of the surface wave travelling along the length of the bar 70 at the side thereof adjacent the web 38 so that the velocity of the wave at this side of the bar 70 will correspond to that at the side adjacent the dielectric 71.

FIGURE 7 illustrates a modification of the embodiment of FIGURE 6 wherein the grooves 70a are filled with a dielectric 72 which may be the same dielectric as that indicated at 71 in FIGURE 5 or may be a different dielectric from that used on the other side of the conductor 70.

FIGURE 8 illustrates a bar 80 having somewhat triangular notches 80a extending across the width thereof and filled with a dielectric 81, while FIGURE 9 illustrates a conductive bar 85 having somewhat circular grooves 85a thereacross filled with a dielectric 86 for the same purpose as the grooves 70a of FIGURES 5 and 6. In the embodiments of FIGURES 8 and 9 as in the embodiments of FIGURES 6 and 7, grooves 80a and 85a provide dielectric gaps in the surfaces 80b and 85b in contact with the web indicated at 38 in FIGURE 5.

FIGURES 10, 11 and 12 illustrate a further modified form of the invention for dealing with the problem of diffraction of the microwave energy due to a solid dielectric medium at one side of the wave guide. As indicated in FIGURE 10, a wave guide 95 is split into two sections 95a and 95b, and the section 95a is embedded in a solid dielectric medium 97 while the section 95b is illustrated as having its external surface in air in sliding contact with the web 38. In this embodiment, a portion 97a of the dielectric 97 separates the sections 95a and 95b. In accordance with this embodiment, the microwave energy is launched onto the wave guide 95 by a launching horn such as indicated at 100 in FIGURE 11 in such a mode that the portion of the energy intersecting the web 38 is substantially independent of the microwave energy which travels in the dielectric 97. For example, the energy may be transmitted in the $TM_{11}$ or $TM_{12}$ mode, the $TM_{11}$ mode being indicated in FIGURE 12. This embodiment allows separation of the wave into two or more parts on the two sides of the conductor. A mode such as indicated in FIGURE 12 may be created by exciting the coaxial launcher 100 in the $TM_{11}$ mode, for example.

Since there are no circumferential electric currents in the mode illustrated in FIGURE 12, transmission of the wave would not be affected by splitting the conductor into two halves as indicated, either with or without a thin dielectric layer between them. If a dielectric is brought up to one side of the split conductor, such as the dielectric 97 in FIGURE 10, the wave component on that side indicated generally at 102 in FIGURE 12 will be slowed but the wave component indicated at 103 on the opposite side of the conductor will be little affected because neither the electric field lines (solid lines in FIGURE 12) nor the magnetic field lines (dash lines in FIGURE 12) encircle the whole conductor.

It will be understood by those skilled in the art that the dimensions and the position of the feed-in line 106 and of the launching device 100 will be selected in accordance with the mode to be propagated along the line 95.

In the case of a flat strip conductor such as indicated at 113 in FIGURE 13 having respective parallel halves 113a and 113b, an oval or rectangular launching device would be utilized to generate a mode such as the $TM_{11}$ mode. The section 113a may be embedded in a dielectric 115 as previously, but small solid dielectric spacer may be utilized as indicated at 118 in place of a solid dielectric spacer occupying the entire gap between the sections to provide mechanical rigidity while reducing losses in the dielectric.

FIGURE 14 illustrates a system wherein microwave energy is radiated from a first launching device or horn 130 and is received by a second horn 131, the energy being projected through a web of paper or the like, for example, indicated at 133 and travelling in the direction of the arrow 134. The microwave power may be generated by means of a suitable Klystron 137 having a cavity 138 whose dimension may be varied by mechanical means indicated at 140. The mechanical means 140 is controlled by means of a solenoid 142 energized from power supply 144 so as to cyclically vary the frequency generated by the Klystron 137 over a relatively wide frequency range. If crystal detectors are utilized at 150 and 151 to detect radiated and received energy, pulse modulation may be introduced from a suitable source 153 which may serve to provide an electrical variation of the power supply to the Klystron 137 at a suitable low frequency rate, the output of the crystal detectors 150 and 151 being fed to a suitable ratio meter 157, for example. The Klystron electric supply power may be varied in step with the mechanical variation of cavity 138 as needed to maintain operation of the Klystron at substantially constant power level. A suitable attenuator for adjusting the power transmitted from Klystron 137 is indicated at 160 and a suitable absorbing termination is indicated at 161 for preventing reflection.

FIGURE 15 illustrates a plot of percentage absorption as a function of frequency for 20 pound Kraft paper (4 pieces) having 12% moisture. It will be observed that the resonance peak is relatively broad so that it would be suitable to vary the frequency of the Klystron 137 over a range of 1250 megacycles per second, for example between 21,500 and 22,750 megacycles per second. By sweeping the microwave frequency over a relatively wide range in the neighborhood of the resonance absorption peak, any standing wave pattern is caused to change continuously over its full range and so average out its effect. At the same time the water absorption resonance is sufficiently broad that the frequency variation has a negligible effect on the quantum absorption. Standing waves are particularly a problem in the case of radiating horns such as illustrated in FIGURE 14 or in the case of a radiating horn and reflecting surface as indicated at 180 and 181 in FIGURE 16. The standing wave pattern and intensity will vary with the frequency of the microwave signal and with the electromagnetic distance between the horns or between the horn and the reflecting surface. This variation will in turn change the measured ratio of received to transmitted power. Insertion of a piece of paper between the horns or between the horn and reflector will change the electromagnetic distance between them due to its dielectric constant and will therefore produce a change in the measured ratio of received to transmitted power irrespective of any change due to quantum absorption in the water molecule. It has been found experimentally that the change due to the standing wave pattern can exceed that due to the water absorption.

In FIGURE 16, the apparatus for producing frequency modulation is the same as in FIGURE 14 and corresponding reference numerals have been applied to similar parts. A pair of directional couplers 184 and 185 transmit radiated and received power to detectors 187 and 188 whose output may be connected with a suitable meter 190. A web of paper or the like 195 may move in the direction of the arrow 196 between the radiating and receiving horn 180 and the reflecting surface 181.

It may be noted that with some Klystrons and in some cases, adequate frequency modulation can be obtained solely by variation of the electric supply power to the Klystron, without need for mechanical variation of the Klystron cavity as in the illustrated embodiments. While troubles from standing waves, due to reflections of microwave energy, do not seem to be serious with single conductor surface wave transmission lines such as illustrated in FIGURES 1 through 13, it may be desirable to frequency modulate the microwave signal in these embodiments also so as to average out any small effects which may exist, and the possibility of frequency modulation is specifically disclosed with respect to the embodiments of FIGURES 1 through 13 as well as in connection with FIGURES 14 and 16.

Figure 18:
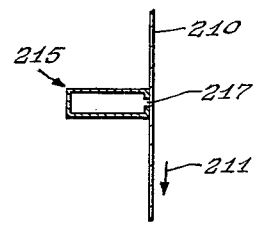
FIGURE 18 is a cross sectional view taken generally along the line XVIII—XVIII of FIGURE 17.

FIGURES 17 and 18 illustrate an embodiment wherein paper or the like 210 travels in the direction of the arrow 211 in sliding contact with a side surface 215a of a rectangular wave guide 215 having a series of apertures therein as indicated at 217. The mode of propagation of microwave energy along the wave guide 215 at the interior thereof is preferably such that the electric vector is generally parallel to the side surface 215a while the magnetic vector is generally at right angles to the side surface 215a, and the magnetic field lines may extend through successive apertures 217 into coupling relation to the web 210 to sense the moisture content thereof. Suitable sensing means may be inserted into the wave guide at the opposite ends of the series of apertures 217 to obtain a measure of the energy absorbed by the web 210 in the same manner as illustrated in FIGURE 1 for the case of an open wire wave guide.

Figure 19:
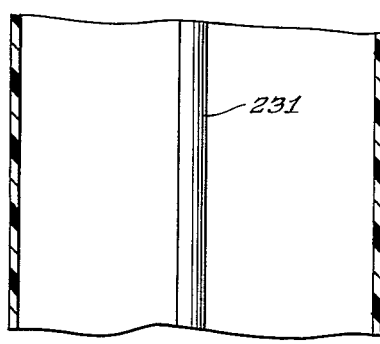
FIGURE 19 is a longitudinal sectional view illustrating the use of a single conductor wave guide within a material-conveying tube for detecting moisture content of material flowing through the tube.

FIGURE 19 illustrates a suitable arrangement for the measurement of moisture content or the like of flowable material capable of being confined within a suitable tube such as indicated at 230. One or more single conductor surface wave guides such as indicated at 231 may be inserted axially of the tube 230 so as to sense the moisture content of material adjacent to the wire by transmitting microwave energy along the wire in the same manner as illustrated in FIGURE 1. As previously described, conductor 231 may comprise a metallic conductor such as copper or steel along which microwave energy is projected in the same manner as illustrated in FIGURE 1. The microwave energy entering the tube 230 and leaving the tube 230 may be measured in the same manner as indicated in FIGURE 1 to obtain a measure of the energy absorbed by the material surrounding the conductor 231 within the tube 230. In certain cases, a solid metallic conductor such as indicated at 231 may be inserted through a solid material to obtain a measure of the moisture content or the like thereof in the same manner as for a flowable material within a tube such as 230.

Figure 20:
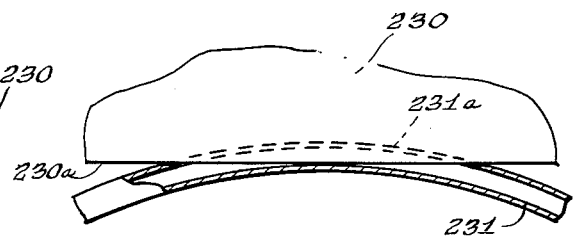
FIGURE 20 illustrates a first embodiment wherein an edge of a sheet of paper or the like is inserted into a longitudinal slot in a curved wave guide of rectangular cross section.

FIGURE 20 illustrates a method of positioning an edge of a sheet of paper or the like indicated at 230 within a rectangular wave guide 231 having a cross section such as indicated in FIGURE 18. In FIGURE 20, the edge of the sheet 230 is inserted through a slot 231a extending longitudinally of a relatively wide top surface of the wave guide and centrally thereof. The wave guide 231 is curved as indicated to provide three point contact with the margin 230a of the sheet to precisely determine the area of the sheet within the wave guide.

Figure 21:
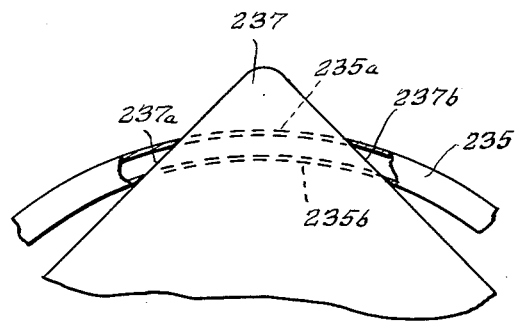
FIGURE 21 is a view of a second embodiment involving a slotted rectangular wave guide for receiving a corner of a sheet of paper or other solid material.

FIGURE 21 illustrates a similar curved wave guide 235 having alinged slots 235a and 235b in the upper and lower relatively wide walls of the wave guide so as to provide four point contact with an edge 237 of a sheet of paper or the like to precisely determine the area of the paper within the wave guide.

Figure 22:
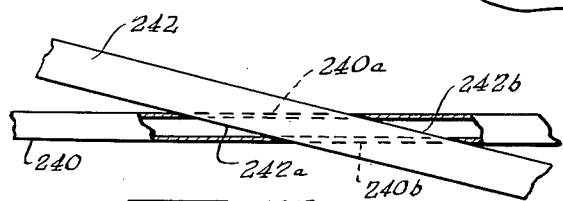
FIGURE 22 is a somewhat diagrammatic illustration of a further embodiment involving a slotted rectangular wave guide wherein a web of paper or the like of predetermined width extends through the upper and lower walls of the wave guide.

FIGURE 22 illustrates a further modification wherein a rectangular wave guide 240 has slots 240a and 240b to receive an elongated web 242 of paper or the like which is of precise width to provide a predetermined area within the wave guide.

In each of the embodiments of FIGURES 20, 21 and 22, it will be observed that the margins of the paper such as 230a in FIGURE 20, 237a and 237b in FIGURE 21 and 242a and 242b in FIGURE 22 extend at an angle to the direction of propagation of the microwave energy along the interior of the wave guides so as to minimize reflection. The energy may be propagated in the $TE_{10}$ mode so that the presence of a narrow slot located lengthwise along one or both of the wide sides of the guide has almost no effect on the power transmitted along the guide. Further, there is almost no radiation of energy through the slot, and any sample inserted through the slot is located in the maximum electric field. In order that the presence of the paper shall cause only negligible reflections of microwave energy, it is preferred that the margins slope relative to the axis of the wave guide along a distance of at least three wavelengths.

It should be noted that it is not essential to use a rectangular wave guide operated in the $TE_{10}$ mode. Guides of other cross sectional shapes and sizes, including coaxial guides and operated in any convenient mode can be used, with the slot suitably located according to the mode. The slot must lie parallel to the electric currents in the guide wall at the location of the slot. For example, using the $TM_{11}$ mode in a rectangular wave guide, the slot or slots could be placed at any convenient location along either the narrow or the wide sides, although preferably in the center of one of the sides. Essentially the same would be true of the $TM_{01}$ mode in circular wave guides although there is here no preferable location around the guide.

As in the preceeding embodiments, the microwave energy may be frequency modulated to average out the effects of standing wave patterns and the like.

In each of the embodiments, it will be understood that microwave energy at a resonance absorption frequency is preferably utilized to sense the presence of the desired constituent in the sample. In each case, an electrical measure is obtained of the energy absorbed by the sample, and the energy may be amplitude or pulse modulated depending on the type of sensing means utilized.

The present invention is, of course, applicable to determining the moisture content or the like of stationary as well as moving bodies. Generally, the invention is directed to detecting moisture content or the like of nonmetallic inorganic materials and organic materials. It is contemplated that the invention will have particular application to cereals, dried foods, flour, breakfast foods, bakery mixes, dehydrated proteins, carbohydrates, cellulose materials, liquid and gaseous hydrocarbons and petroleum products, for example.

It will be apparent that many modifications and variations may be effected without departing from the scope of the novel concepts of the present invention.

I claim as my invention:

1. In combination, a surface wave transmission line having an elongated external surface for guiding a microwave signal, means for supporting a material having a constituent substantially affecting said signal adjacent said external surface, and means for sensing the effect of said material on said signal, said surface wave transmission line having a solid dielectric on one side thereof and having a diffraction inhibiting means on the side thereof adjacent said supporting means for tending to prevent diffraction of the signal in spite of the presence of said solid dielectric on said one side of said surface wave transmission line.

2. In combination, a surface wave transmission line comprising an elongated member for guiding a microwave signal, a body having a constituent substantially affecting said signal disposed adjacent one side of said member, means for sensing the effect of said body on said signal, a solid dielectric on the side of said member away from said body, and said member having diffraction inhibiting means for tending to prevent diffracton of the signal from the member in spite of the presence of said solid dielectric.

3. In combination, a surface wave transmission line comprising an elongated member for guiding a microwave signal, a body having a constituent substantially affecting said signal disposed adjacent one side of said member, means for sensing the effect of said body on said signal, a solid dielectric on the side of said member away from said body, and diffraction inhibiting means for tending to prevent diffraction of the signal from the member in spite of the presence of said solid dielectric, said diffraction inhibiting means comprising a relatively thin layer of a second solid dielectric of relatively high dielectric constant in comparison to the dielectric constant of the first-mentioned solid dielectric, said layer being interposed between said member and said body.

4. In combination, a surface wave transmission line comprising an elongated member for guiding a microwave signal, a body having a constituent substantially affecting said signal disposed adjacent one side of said member, means for sensing the effect of said body on said signal, a solid dielectric on the side of said member away from said body, and diffraction inhibiting means for tending to prevent diffraction of the signal from the member in spite of the presence of said solid dielectric, said diffraction inhibiting means comprising a relatively thin layer of a second solid dielectric of relatively high dielectric constant in comparison to the dielectric constant of the first-mentioned solid dielectric, said layer being interposed between said member and said body and said layer having high abrasion resistance in comparison with the material of said member, said body being in sliding contact with said layer.

5. In combination, wave guide means comprising an elongated member for guiding a microwave signal, a body having a constituent substantially affecting said signal disposed adjacent one side of said member, means for sensing the effect of said body on said signal, a solid dielectric on the side of said member away from said body, and diffraction inhibiting means for tending to prevent diffraction of the signal from the member in spite of the presence of said solid dielectric, said diffraction inhibiting means comprising a relatively thin layer of a second solid dielectric of relatively high dielectric constant in comparison to the dielectric constant of the first-mentioned solid dielectric, said layer being interposed between said member and said body, said member comprising a wire having a surface of electrically conductive material, said first-mentioned solid dielectric being in contact with a first portion of the periphery of the wire and said second solid dielectric being in contact with a further portion of the periphery of the wire.

6. In combination, wave guide means comprising an elongated member for guiding a microwave signal, a body having a constituent substantially affecting said signal disposed adjacent one side of said member, means for sensing the effect of said body on said signal, a solid dielectric on the side of said member away from said body, and diffraction inhibiting means for tending to prevent diffraction of the signal from the member in spite of the presence of said solid dielectric, said diffraction inhibiting means comprising a relatively thin layer of a second solid dielectric of relatively high dielectric constant in comparison to the dielectric constant of the first-mentioned solid dielectric, said layer being interposed between said member and said body, said member comprising a bar of electrically conductive material having a flat side adjacent said body and an opposite side, said first-mentioned solid dielectric being in contact with said opposite side of said member and said second solid dielectric being in contact with said flat side of said bar.

7. In combination, a surface wave transmission line comprising an elongated member for guiding a microwave signal, a body having a constituent substantially affecting said signal disposed adjacent one side of said member, means for sensing the effect of said body on said signal, a solid dielectric on the side of said member away from said body, and diffraction inhibiting means for tending to prevent diffraction of the signal from the member in spite of the presence of said solid dielectric, said diffraction inhibiting means comprising means providing discontinuities on the side of said member adjacent said body.

8. In combination, a surface wave transmission line comprising an elongated member for guiding a microwave signal, a body having a constituent substantially affecting said signal disposed adjacent one side of said member, means for sensing the effect of said body on said signal, a solid dielectric on the side of said member away from said body, and diffraction inhibiting means for tending to prevent diffraction of the signal from the member in spite of the presence of said solid dielectric, said diffraction inhibiting means comprising groove means along the side of said member adjacent said body.

9. In combination, wave guide means comprising an elongated member for guiding a microwave signal as a surface wave, a body having a constituent substantially affecting said signal disposed adjacent one side of said member, means for sensing the effect of said body on said signal, a solid dielectric on the side of said member away from said body, and diffraction inhibiting means for tending to prevent diffraction of the signal from the member in spite of the presence of said solid dielectric, said diffraction inhibiting means comprising a dielectric gap separating the side of said member at which the solid dielectric medum is located from the side of said member adjacent said body.

10. In combination, means for generating a microwave signal and having an output for delivering said microwave signal therefrom, a surface wave transmission line coupled to said output for transmitting said signal therealong as a surface wave, a test solid dielectric material on one side of said transmission line and in the field associated with said transmission line and produced by said signal, means for detecting said signal as an indication of the absorption characteristics of said test solid dielectric material, a rigid solid dielectric support connected to the surface wave transmission line along an extended length portion thereof on the side thereof opposite said one side, and means for substantially equalizing the wave velocities of the surface wave in the support and on said one side of said line.

11. In combination, means for generating a microwave signal and having an output for delivering said microwave signal therefrom, a surface wave transmission line coupled to said output for transmitting said signal therealong as a surface wave, a test solid dielectric material on one side of said transmission line and in the field associated with said transmission line and produced by said signal, means for detecting said signal as an indication of the absorption characteristics of said test solid dielectric material, a rigid solid dielectric support connected to the surface wave transmission line along an extended length portion thereof on the side thereof opposite said one side, and said transmission line being separated into two components lengthwise thereof one adjacent said support and one relatively remote from said support.

12. In combination, means for generating a microwave signal, said microwave generating means having an output for delivering said microwave signal therefrom, a surface wave transmission line, means for coupling the output of said microwave generating means to said surface wave transmission line to transmit said microwave signal along said transmission line as a surface wave, means for exposing a dielectric material having a constituent to be detected intimately associated therewith to the field of said surface wave, the frequency of said surface wave being such as to give a reliable indication of the presence of said constituent within its field, means for detecting the interaction of said surface wave with said constituent, and means providing a rigid connection between said detecting means and said surface wave line requiring joint movement thereof.

13. In combination, means for generating a microwave signal, said microwave generating means having an output for delivering said microwave signal therefrom, a surface wave transmission line, means for coupling the output of said microwave generating means to said surface wave transmission line to transmit said microwave signal along said transmission line as a surface wave, supporting means for receiving a dielectric material having a constituent to be detected intimately associated therewith in contacting relation to said supporting means within the field of said surface wave, the frequency of said surface wave being such as to give a reliable indication of the presence of said constituent within its field, means for detecting the interaction of said surface wave with said constituent, means providing a rigid connection between said detecting means and said transmission line requiring joint movement thereof, and means providing a rigid connection between said supporting means and said transmission line.

14. In combination, means for generating a microwave signal, said microwave generating means having an output for delivering said microwave signal therefrom, a surface wave transmission line, means for coupling the output of said microwave generating means to said surface wave transmission line to transmit said microwave signal along said transmission line as a surface wave, said line having rigid self-sustaining means for guiding a dielectric material having a constituent to be detected intimately associated therewith within the field of said surface wave, the frequency of said surface wave being such as to give a reliable indication of the presence of said constituent within its field, means for detecting the interaction of said surface wave with said constituent, and means providing a rigid connection between said rigid self-sustaining guiding means and said transmission line requiring joint movement thereof.

15. In combination, means for generating a microwave signal, said microwave generating means having an output for delivering said microwave signal therefrom, a surface wave transmission line comprising a metal conductor having a specific conductivity of the order of the specific conductivity of steel, means for coupling the output of said microwave generating means to said surface wave transmission line to transmit said microwave signal along said transmission line as a surface wave, means accommodating relative movement of a solid dielectric material having a constituent to be detected intimately associated therewith into stably coupled relationship to said surface wave transmission line with said material in sliding contact with said conductor and with a predetermined cross section of said material having a representative sample of said constituent within the field of said surface wave, the frequency of said surface wave being such as to give a reliable indication of the amount of said constituent within its field, and means for detecting said surface wave as a measure of the amount of said constituent associated with said material.

16. In combination, means for generating a microwave signal, said microwave generating means having an output for delivering said microwave signal therefrom, a surface wave transmission line, means for coupling the output of said microwave generating means to said surface wave transmission line to transmit said microwave signal along said transmission line as a surface wave, means for exposing a solid dielectric material having a constituent to be detected intimately associated therewith to the field of said surface wave, the frequency of said surface wave being approximately at a resonance absorption frequency for said constituent, means providing a stable coupling relationship between said dielectric material and said surface wave transmission line, and means for detecting the interaction of said surface wave with said constituent.

17. A system for sensing a constituent intimately associated with a material comprising an elongated hollow wave guide having side wall portions for guiding microwave energy along a longitudinal axis thereof within said wave guide, said wave guide having slots in opposite side wall portions thereof, said slots having substantially greater length dimensions than width dimensions and the length dimensions of said slots extending substantially parallel to said longitudinal axis of said waveguide and said slots being offset from each other in the direction longitudinally of the axis of the wave guide to define a path for a web of material having a constituent to be detected and of cross section corresponding to the cross section of said slots, said path extending through the interior of said wave guide at an acute angle to the axis of the wave guide to position the web with its lateral edges extending through the interior of the wave guide at acute angles to the axis of the wave guide.

18. In combination, a hollow wave guide having opposite side wall portions, one of said side wall portions having a longitudinal slot for receiving an edge portion only of a sheet of material of predetermined area, said wave guide being curved in the longitudinal direction at the region thereof having said longitudinal slot, the other of said side wall portions of said wave guide being substantially closed opposite said slot in said one side wall portion, and the opposite longitudinal ends of the longitudinal slot lying in a plane which extends generally tangent to said other side wall portion so that said longitudinal slot is adapted to receive a straight edge of said sheet extending tangent to said other side wall portion.

19. In combination, a hollow wave guide having opposite side wall portions with longitudinal slots therein substantially directly opposite each other but of substantially different lengths to accommodate insertion of a corner of a sheet of material having a constituent to be detected by wave energy transmitted along said wave guide, and means for detecting said wave energy as a measure of the constituent of said material.

20. Apparatus for sensing a constituent of web material comprising rigid means of relatively massive rigid material providing a substantially rigid guiding surface for stable contact with a section of an elongated web over substantially the entire area of said section, web driving means for continuously driving the elongated web in the direction of its length across said guiding surface to position successive sections of the web in stable contact with said guiding surface in successive instants of time, said rigid means rigidly backing said guiding surface over substantially the entire area thereof which is in contact with said section of said web to prevent deflection of said guiding surface resulting from movement of the web thereacross, means for generating a microwave signal of a frequency substantially equal to the resonant absorption frequency for said constituent and having an output for delivering said microwave signal therefrom, microwave transmitting means for transmitting microwave energy along a path in energy coupling relationship to said section of said web instantaneously in contact with said guiding surface, means for coupling the output of said microwave signal generating means to said microwave transmitting means for transmitting said microwave signal along said path in energy coupling relation to said section of said web instantaneously in contact with said guiding surface, and output means coupled to said microwave signal for providing an output signal varying in accordance with the amount of said constituent in the successive sections of said web contacting said guiding surface in successive instants of time, said output means being receptive of microwave energy travelling along said path in energy coupling relation to said section of web instantaneously contacting said guiding surface but having substantially excluded therefrom any microwave energy intersecting portions of said web in advance of and beyond said section of web instantaneously in contact with said guiding surface to provide a stable and reliable output signal substantially independent of any fluctuations in position of portions of the web in advance of and beyond said guiding surface and governed substantially exclusively by the interaction of said microwave signal with said section of said web instantaneously in contact with said guiding surface.

21. Apparatus for sensing moisture content of a solid dielectric material comprising a surface wave transmission line having an elongated external surface for guiding a microwave signal of a resonance absorption frequency for water as a surface wave, means for supporting a solid dielectric material whose moisture content is to be sensed adjacent said external surface and in the field of said surface wave at one side of said line, and means for sensing the effect of said solid dielectric material on said surface wave, said line having means for providing a first surface wave component of said microwave signal guided by said line at said one side thereof for impingement on said material and for providing a second surface wave component of said microwave signal at the side of said line remote from said material whose field is substantially separate from the field of said first surface wave component and which is capable of traveling at a different velocity than said first surface wave component without substantial loss of signal energy from said line.

22. Apparatus for sensing moisture content comprising a waveguide having a hollow interior and having aperture means in a side wall opening into said interior for accommodating insertion of sheet material into the interior of said waveguide with the edges of the sheet material in predetermined positions at an acute angle to the axis of the waveguide, means for transmitting a microwave signal along said axis of said waveguide of a frequency substantially equal to the resonant absorption frequency for water to give a reliable indication of the presence of moisture in said sheet material, and means for detecting the interaction of said microwave signal with said material as a measure of the moisture content thereof, said aperture means having a relatively large length dimension extending substantially parallel to the axis of the waveguide and having a relatively small width dimension transverse to the axis of the waveguide to position the sheet material in a plane substantially parallel to the axis of the waveguide.

23. Apparatus for measuring moisture content of solid dielectric material comprising means for generating a microwave signal having a frequency substantially equal to the resonance absorption frequency for water, a surface wave transmission line, means for coupling said microwave signal generating means to said surface wave transmission line for transmisison of said microwave signal along said line as a surface wave of said resonance absorption frequency for water, means for positioning a solid dielectric material whose moisture content is to be determined in coupling relation to the field of said surface wave, and means for detecting said signal as a measure of the moisture content of said solid dielectric material.

24. Apparatus for measuring moisture content of solid dielectric material comprising means for generating a microwave signal having a frequency substantially equal to the resonance absorption frequency for water, a surface wave transmission line, means for coupling said microwave signal generating means to said surface wave transmission line for transmission of said microwave signal along said line as a surface wave of said resonance absorption frequency for water, means for moving a solid dielectric material across and in contact with said surface wave transmission line to bring successive increments of the material into interaction with the surface wave transmitted along said transmission line, and means for detecting said surface wave as a measure of the moisture content of said solid dielectric material.

25. Apparatus for measuring moisture content of solid dielectric material comprising a surface wave transmission line, means for coupling microwave energy of a frequency substantially equal to the resonance absorption frequency for water to said transmission line for travel along said transmission line as a surface wave of said resonance absorption frequency, means for removably positioning a solid dielectric material whose moisture content is to be determined in stable relation adjacent said line and in the field associated with said surface wave, and means for detecting said microwave energy as a measure of the moisture content of said solid dielectric material.

26. Apparatus for measuring the moisture content of a web of solid dielectric material comprising an elongated hollow waveguide for transmitting microwave energy therealong, a source of microwave energy of microwave frequency substantially equal to the resonance absorption frequency for water coupled to said waveguide for supplying a microwave signal of said microwave frequency to said waveguide for transmission therealong, said waveguide having aperture means in a side wall thereof which side wall is generally parallel to the electric vector of said signal to couple microwave energy to a region exterior to said side wall of said waveguide, an elongated web of solid dielectric material whose moisture content is to be determined extending across said side wall of said waveguide and in extended area conforming contact with the exterior surface of said side wall adjacent said aperture means and in stable overlying relation to said aperture means at said region exterior to said side wall, said wave guide having an unobstructed path generally in the plane of said side wall at each side of said waveguide for accommodating movement of said web to and across said side wall of said waveguide, and means for detecting said signal as a measure of the moisture content of said web.

27. The method of measuring the moisture content of a solid dielectric material which comprises projecting a microwave signal of frequency substantially equal to the resonance absorption frequency for water as a surface wave along an extended paths, continuously moving the solid dielectric material through the field of said surface wave and transversely to said extended path, stably supporting the portion of said solid dielectric material in the field of said surface wave at a precisely determined position relative to said path, and detecting said microwave signal after travel along said extended path as a measure of the moisture content of said solid dielectric material.

28. Apparatus for sensing a constituent of solid dielectric material comprising means for generating a microwave signal, said microwave generating means having an output for delivering said microwave signal therefrom, a surface wave transmission line, means for coupling the output of said microwave generating means to said surface wave transmission line to transmit said microwave signal along said transmission line as a surface wave, means accommodating relative movement of a solid dielectric material having a constituent to be detected into stably coupled relationship to said surface wave transmission line and for stably supporting said solid dielectric material with a predetermined cross section of said material having a representative sample of said constituent within the field of said surface wave, the frequency of said surface wave being substantially equal to the resonance absorption frequency for said constituent, and means for detecting said surface wave as a measure of the amount of said constituent associated with said material.

29. Apparatus for measuring moisture content of solid dielectric material comprising means for generating a microwave signal, said microwave generating means having an output for delivering said microwave signal therefrom, a surface wave transmission line, means for coupling the output of said microwave generating means to said surface wave transmission line to transmit said microwave signal along said transmission line as a surface wave, said surface wave transmission line comprising a bar having a flat surface for receiving a solid dielectric material in conforming stable relation to said surface, the frequency of said surface wave being substantially equal to a resonance absorption frequency for water, material feeding means for moving said solid dielectric material across said flat surface in sliding stable contacting relation thereto, and means for detecting the interaction of said surface wave with said material in sliding contacting relation to said flat surface as a measure of the moisture content of said material.

30. Apparatus for measuring the moisture content of a solid dielectric material comprising means for generating a microwave signal of frequency substantially equal to the resonance absorption frequency for water, said microwave generating means having an output for delivering said microwave signal therefrom, a surface wave transmission line assembly of rigid self-sustaining construction and comprising a surface wave transmission line, means for coupling the output of said microwave generating means to said surface wave transmission line to transmit said microwave signal along said transmission line as a surface wave of said resonance absorption frequency, said surface wave transmission line assembly having an extended smooth generally flat surface and having a solid dielectric material whose moisture content is to be determined in extended area conforming sliding contact with said surface and in the field of said surface wave, and means for detecting the interaction of said surface wave with said solid dielectric material as a measure of the moisture content of said material.

31. Apparatus for detecting moisture content of a solid dielectric material comprising hollow waveguide means for guiding electromagnetic energy interiorly thereof, a source of electromagnetic energy of a sensitive frequency substantially equal to a resonance absorption frequency for water coupled to said waveguide means for supplying an electromagnetic signal of said sensitive frequency to said waveguide means for transmission therealong, said waveguide means having means for coupling the magnetic field associated with said signal to a test region at the exterior of said waveguide means, means for stably supporting a solid dielectric material whose moisture content is to be determined in said test region at the exterior of said waveguide means and in coupling relation to the magnetic field associated with said signal, and means for detecting said signal as a measure of the moisture content of said material.

32. The method of measuring the amount of a constituent intimately associated with a solid dielectric material comprising projecting a microwave signal of frequency substantially equal to the resonance absorption frequency for said constituent along a hollow waveguide having aperture means for coupling the wave energy to a test region at the exterior of the waveguide, relatively moving a predetermined cross section of the solid dielectric material into said test region and stably positioning said material in coupled relation to said signal with a predetermined cross section of said material having a representative sample of said constituent within the field of said signal at the exterior of said waveguide in said test region, and detecting the effect of said constituent of said material on said microwave signal of said resonance absorption frequency as a measure of the amount of said constituent associated with said material.

33. The combination of claim 12 with said detecting means being disposed laterally adjacent said surface wave transmission line in coupling relation to the surface wave transmitted therealong, and said rigid connection providing means comprising a solid dielectric material imbedding said transmission line and said detecting means as a unit.

34. The combination of claim 16 with said stable coupling relationship providing means comprising rigid means contacting said surface wave transmission line and said dielectric material and providing a rigid spacial relationship between said dielectric material and said surface wave transmission line.

References Cited in the file of this patent

UNITED STATES PATENTS

| | | |
|---|---|---|
| 2,449,182 | Sontheimer | Sept. 14, 1948 |
| 2,457,695 | Liskow | Dec. 28, 1948 |
| 2,505,557 | Lyman | Apr. 25, 1950 |
| 2,591,329 | Zaleski | Apr. 1, 1952 |
| 2,659,860 | Breazeale | Nov. 17, 1953 |
| 2,685,068 | Goubau | July 27, 1954 |
| 2,721,312 | Grieg et al. | Oct. 18, 1955 |
| 2,729,786 | Wild et al. | Jan. 3, 1956 |
| 2,735,069 | Riblet | Feb. 14, 1956 |
| 2,782,382 | Clavier et al. | Feb. 19, 1957 |
| 2,792,548 | Hershberger | May 14, 1957 |
| 2,794,959 | Fox | June 4, 1957 |
| 2,798,197 | Thurston | July 2, 1957 |
| 2,810,891 | Engelmann | Oct. 22, 1957 |
| 2,890,424 | Arditi et al. | June 9, 1959 |
| 2,898,561 | Hayes | Aug. 4, 1959 |
| 2,907,961 | Tomiyasu | Oct. 6, 1959 |
| 2,911,601 | Gunn et al. | Nov. 3, 1959 |

FOREIGN PATENTS

| | | |
|---|---|---|
| 708,589 | Great Britain | May 5, 1954 |

OTHER REFERENCES

Chandler: "An Investigation of Dielectric Rod as Wave Guide," Journal of Applied Physics, vol. 20, December 1949.

Kiely: "Experiments With Single-Wire Transmission Lines at 3-CM Wavelength," Journal of British Institution of Radio Engineers, April 1953.

IRE Transactions, vol. MTT-3, March 1955, No. 2.

Harris et al.: "Measurement of High Permittivity Dielectrics at Microwave Frequencies," Review of Scientific Instruments, vol. 26, No. 5, May 1955.